(12) United States Patent
Katsuda et al.

(10) Patent No.: US 6,336,660 B1
(45) Date of Patent: Jan. 8, 2002

(54) GAS GENERATOR FOR AN AIR BAG

(75) Inventors: Nobuyuki Katsuda; Akihisa Ogawa, both of Himeji (JP)

(73) Assignee: Daicel Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/284,276

(22) PCT Filed: Oct. 29, 1996

(86) PCT No.: PCT/JP96/03166

§ 371 Date: Jun. 17, 1999

§ 102(e) Date: Jun. 17, 1999

(87) PCT Pub. No.: WO98/18659

PCT Pub. Date: May 7, 1998

(51) Int. Cl.[7] .............................................. B60R 21/28
(52) U.S. Cl. ...................................... 280/741; 280/236
(58) Field of Search ........................... 280/728.1, 728.2, 280/736, 741, 742

(56) References Cited

U.S. PATENT DOCUMENTS

| | | | | |
|---|---|---|---|---|
| 5,064,459 A | * | 11/1991 | Unterforsthuber et al. | 280/736 X |
| 5,149,129 A | * | 9/1992 | Unterforsthuber et al. | 280/736 X |
| 5,217,697 A | * | 6/1993 | Kanazawa et al. | 280/743 X |
| 5,221,107 A | * | 6/1993 | O'Laughlin | 280/728.1 |
| 5,248,162 A | * | 9/1993 | Levosinski et al. | |
| 5,366,239 A | * | 11/1994 | Headley | 280/728.1 |
| 5,387,007 A | * | 2/1995 | Ogawa et al. | 280/736 X |
| 5,738,374 A | * | 4/1998 | Marsaud et al. | 280/741 |
| 6,079,739 A | * | 6/2000 | Perotto et al. | 280/736 |
| 6,095,558 A | * | 8/2000 | Bayer et al. | 280/741 |
| 6,189,924 B1 | * | 2/2001 | Hock | 280/736 |

FOREIGN PATENT DOCUMENTS

| | | | |
|---|---|---|---|
| DE | 3939021 | * | 11/1990 |
| DE | 4317727 | * | 12/1993 |
| JP | 3075289 | * | 3/1991 |
| JP | 406255442 | * | 9/1994 |
| JP | 07 61315 A | | 3/1995 |
| JP | 08 29696 B | | 3/1996 |

* cited by examiner

Primary Examiner—Brian L. Johnson
Assistant Examiner—Bryan Fischmann

(57) ABSTRACT

A gas generator for an airbag is provided which is small and lightweight and enables an efficient use of the filter. This gas generator includes: a first member with one end open; a second member closing the open end of the first member; an ignition unit and a gas generating unit, both installed in a container formed by the first and second members; a filter arranged along an outer circumference of the container to enclose gas passing ports formed in the container; and a strip plate member arranged along an outer circumference of the filter, having a width smaller than the width of the filter and adapted to prevent a radial expansion of the filter, or a mesh member covering the filter.

5 Claims, 2 Drawing Sheets

GAS GENERATOR FOR AN AIR BAG

This application is the national phase under 35 U.S.C. §371 of PCT International Application No. PCT/JP96/03166 which has an International filing date of Oct. 29, 1996 which designated the United States of America.

BACKGROUND OF THE INVENTION

1. Field of the Invention

The present invention relates to an airbag gas generator for protecting an occupant from an impact and more specifically to a gas generator which can be reduced in size and weight and can make an efficient use of a filter.

2. Description of the Related Art

An example of a conventional airbag gas generator is illustrated in FIG. 4. The gas generator includes: a housing 31 having gas discharge ports 30; an ignition means accommodating chamber 32 formed in a central part of the housing 31; a combustion chamber 33 formed on the outer side of the ignition means accommodating chamber 32; a coolant filter chamber 34 formed on the outer side of the combustion chamber 33; ignition means, i.e., an igniter 35 and a transfer charge 36, disposed in the ignition means accommodating chamber 32; gas generating means i.e. a canister 38 filled with a gas generating agent 37, disposed in the combustion chamber 33 and to be ignited by the ignition means to generate a gas; a coolant 39 for cooling a combustion gas generated in the combustion chamber 33 and cleaning means for cleaning or purifying the combustion gas, i.e., a filter 40, both disposed in the coolant filter chamber 34.

A plurality of gas discharge ports 30 are formed in the housing 31 in a circumferential direction at predetermined intervals.

The coolant filter chamber 34 is divided by a retainer 42 into an upper tier chamber and a lower tier chamber, the upper tier chamber accommodating the filter 40 and the lower tier chamber accommodating the coolant 39.

When a sensor (not shown) senses an impact, its signal is sent to the igniter 35, which is then activated to ignite the transfer charge 36. The transfer charge 36 when ignited generates high-temperature and high-pressure flames, which pass through openings 41, fractures the wall of the canister 38 and then ignites the gas generating agent 37 contained therein. Then, the gas generating agent 37 burns to generate a gas, which then passes through gas passing ports 44 of a combustor cup 43 and passes through the coolant 39, during which period the gas is cooled and removed of combustion residues. Further as the gas passes through the filter 40, the remaining combustion residues are removed. The cooled and cleaned gas flows through the gas discharge ports 30 into an airbag (not shown). The inflow-gas inflates the airbag, forming a cushion between an occupant and a hard structure to protect the occupant against an impact.

In the conventional gas generator described above, the gas discharge ports are disposed downstream of the filter with respect to the gas flow direction and are formed intermittently at predetermined intervals. Hence, the gas flow that enter and pass through the filter and move out of the housing tend to concentrate toward the gas discharge ports and therefore do not reach the portions of the filter between the adjacent gas discharge ports. As a result, these filter portions are not used effectively. In other words, an efficient utilization cannot be made of the entire area of the filter.

In the above conventional gas generator, the coolant filter chamber where the filter is installed is formed outside the combustion chamber. This construction increases the diameter of the gas generator, which causes a problem of increased size and weight of the gas generator.

SUMMARY OF THE INVENTION

An object of this invention is to provide a novel gas generator that solves problems experienced in the prior art described above.

This invention provides an airbag gas generator which comprises: a first member with one end thereof open; a second member closing the open end of the first member; an ignition units and a gas generating agent, both disposed in a container formed by the first and second members; a filter arranged around an outer circumference of the container to enclose gas passing ports formed in the container; and (1) a strip plate member having a width smaller than the width of the filter and adapted to prevent a radial expansion of the filter, or (2) a mesh member covering the filter, both arranged around an outer circumference of the filter.

In the gas generator including the container, the gas passing ports and the filter, (1) the strip plate member or (2) the mesh member is also provided.

The filter is held between the first member and the second member. The filter is arranged along the outer circumference of the container to enclose the gas passing ports formed in the container. The first member and the second member together form the gas discharge port outside the filter. An outer side surface 20 of the filter faces the gas discharge port.

The gas passing through the gas passing ports enters the filter and is then introduced from the gas discharge port into the airbag.

The strip plate member is preferably installed at the gas discharge port, which is therefore defined by the first member, the second member, and the strip plate member. The gas passing ports are preferably disposed not to oppose the gas discharge port in radial direction so that the gas does not flow out straight in radial direction but flows out in a curved path. In other words, the flow path in the filter is preferably extended.

It is preferred that the strip plate member and the mesh member be preferably made of a stainless steel material and that the mesh member has a stainless steel wire mesh covering the entire surface thereof.

(1) The strip plate member is arranged along the outer circumference of the filter and has a width smaller than that of the filter. Hence, there is an uncovered portion of the filter which is not covered by the strip plate member. This uncovered portion functions as a continuous window to allow the gas to pass through the filter when it has entered the filter. This continuous window eliminates a problem that the gas flows tend to concentrate toward gas discharge ports used in the conventional gas generator.

When the gas applies a force to the filter, the filter tends to expand outwardly in radial direction. This tendency is restricted by the strip plate member.

(2) The mesh member is arranged along the outer circumference of the filter to cover the filter. The mesh member allows passage of gas through its entire area. This eliminates the problem of the conventional gas generator in which the gas flow tends to concentrate toward gas discharge ports. The gas flow passing through the filter do not concentrate but passes through the entire area of the mesh member located adjacent to the filter before flowing out into the airbag.

The mesh member may be formed of, for example, laminated layers of stainless steel wire mesh.

With the gas generator of this invention constructed as described above, the gas can pass through the entire area of the filter, thus realizing an efficient use of the filter.

The gas generator of this invention obviates the need for the coolant filter chamber provided in the conventional gas generator. This not only simplifies the construction of the gas generator but reduces the diameter of the gas generator. As a result, the gas generator can be reduced in size and weight.

DETAILED DESCRIPTION OF THE EMBODIMENTS

Now one embodiment of this invention will be described with reference to the drawings.

Figure 1:
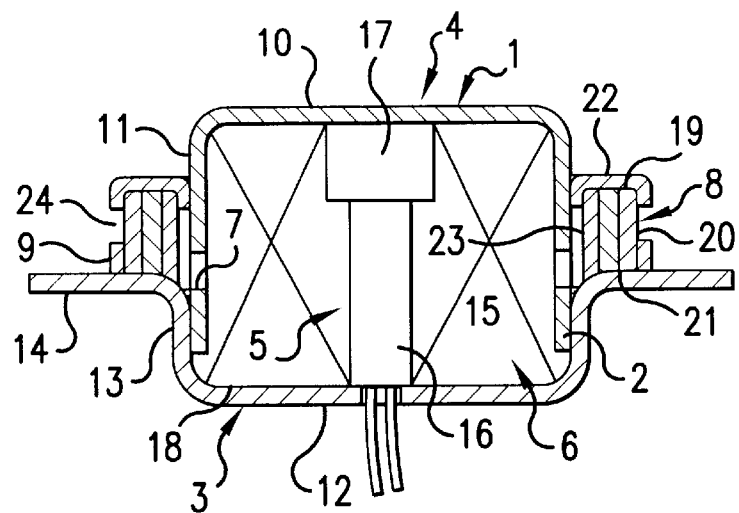
FIG. 1 is a cross-sectional view of one embodiment of a gas generator.

FIG. 1 is a cross-sectional view of one embodiment of the gas generator according to this invention. The gas generator includes a first member 1, a second member 3, ignition means 5, gas generating means 6, a filter 8, and a strip plate member 9. The first member 1 and the second member 3 are formed by press working.

The first member 1 is cylindrical in shape and has one end open and the other end closed. The first member 1 has an open end portion 2, a circular portion 10, and a circumferential wall portion 11 formed around the periphery of the circular portion 10. The circumferential wall portion 11 is formed with a plurality of gas passing ports 7 arranged in a circumferential direction.

The second member 3 has a dish shape and closes the open end portion 2 of the first member 1. The second member 3 has a circular portion 12, a circumferential wall portion 13 formed around the periphery of the circular portion 12, and a flange portion 14 formed at the front end portion of the circumferential wall portion 13. The circumferential wall portion 13 has an inner diameter such that it can receive the circumferential wall portion 11 therein. The front end portion of the circumferential wall portion 11 fits into the inner side of the circumferential wall portion 13, and a weld portion 15 is formed in a circumferential direction along an engagement portion between the circumferential wall portion 11 and the circumferential wall portion 13. The first member 1 and the second member 3 are welded together at the weld portion 15 to form a container 4 having a space therein.

Installed in the container 4 are the ignition means 5 and the gas generating means 6. The ignition means 5 comprises a squib (igniter) 16 and an enhancer (transfer charge) 17. The enhancer 17 is accommodated in a container which is in contact with the squib 16. The gas generating means 6 comprises a canister 18, which is an annular thin aluminum container filled with a gas generating agent.

Around the container 4 is arranged the filter 8, which comprises several laminated layers of intertwined fiber body arranged at the center of the filter and several layers of wire mesh surrounding the inner and outer sides, with respect to a radial direction, of the laminated fiber body. This filter 8 is rectangular in cross section and has an upper end surface 19, an outer side surface 20, a lower end surface 21, and an inner side surface 23. The upper end surface 19 hermetically contacts the inner surface of a support member 22, have a L-shaped in cross section which secured to the circumferential wall portion 11. The lower end surface 21 hermetically contacts the upper surface of the flange portion 14 of the second member. In this way, the filter 8 is supported restricted in the vertical direction and in the radial direction. The inner side surface 23 encloses the gas passing ports 7 with a predetermined clearance therebetween.

The strip plate member 9 is made of a strip of stainless steel plate. The strip plate member 9 surrounds the filter along the outer side surface 20 of the filter and has a width about half that of the filter. The strip plate member 9 is located at the lower half of the filter 8 and opposed to the gas passing ports 7. The strip plate member 9 forms a circumferentially continuous window 24 between it and the support member 22, which allows the gas to pass through its entire area.

In the gas generator of the above construction, when a sensor (not shown) detects an impact and sends an electric signal to the squib 16, the squib 16 is activated to ignite the enhancer 17 that produces high-temperature and high-pressure flames. The flames break the wall of the container that accommodates the enhancer 17 and ignites the gas generating agent inside the canister. A gas produced by the combustion of the gas generating agent passes through the gas passing ports 7 into the filter 8. After entering the filter 8, the gas diffuses in the filter 8 and strikes the strip plate member 9. The gas that has struck the strip plate member 9 changes its course along the strip plate member 9. The gas that has diffused in the filter 8 flows in a diffuse state into an airbag (not shown) through the window 24. In the mean time the combustion gas is cooled and cleared of combustion residues. The combustion gas that has flowed into the airbag inflates the airbag to form a cushion between an occupant and a hard structure, protecting the occupant from impacts.

Figure 1A:
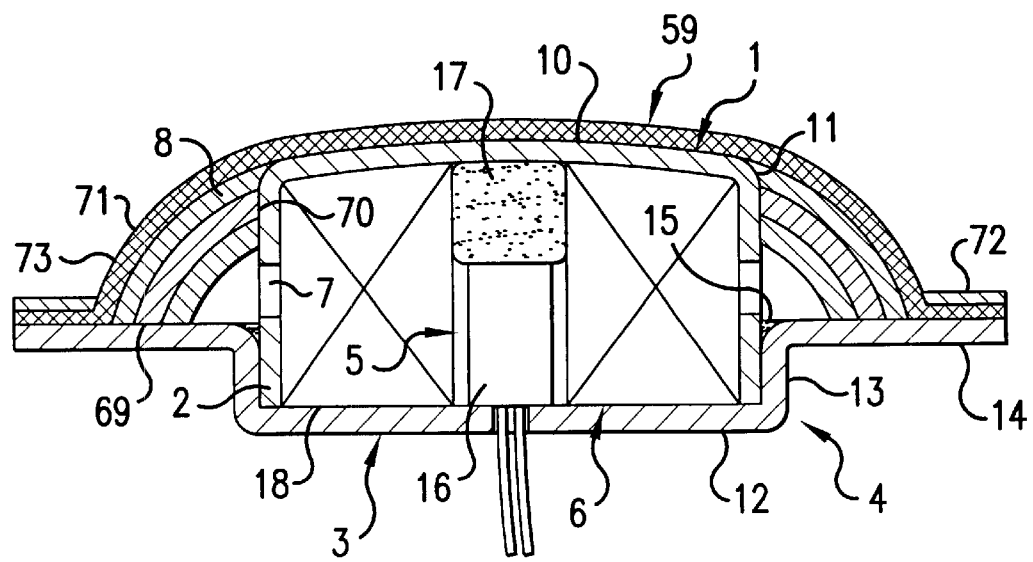
FIG. 1a is a cross-sectional view of one embodiment of a gas generator.

FIG. 1a shows a mesh member 59 instead of the strip plate member shown in FIG. 1. The front end portion of the circumferential wall portion 11 fits inside the circumferential wall portion 13, with the front end surface of the circumferential wall portion 11 in contact with the inner surface of the circular portion 12. The filter 8 has a vertical end surface 70, an inclined curved portion 71, and a horizontal end surface 69. The vertical end surface 70 hermetically contacts the outer circumferential surface of the circumferential wall portion 11 of the first member, and the horizontal end surface 69 hermetically contacts the upper surface of the flange portion 14 of the second member. The inclined curved portion 71 encloses the gas passing ports 7 with a predetermined clearance therebetween.

The mesh member 59 is made by laminating layers of stainless steel wire mesh. The mesh member 59 wholly covers the container 4 from above. That is, it covers the outer surface of the circular portion 10 of the first member, the outer circumferential surface of the inclined curved portion 71 of the filter, and the upper surface of the flange portion 14 of the second member. The mesh member 59 is clamped at its outer periphery between a fixing ring 72 and the flange portion 14 and secured to the container 4. An area 73 of the mesh member 59 that opposes the gas passing ports 7 maybe provided with a plate member for diffusing gas.

The mesh member 59 allows the gas to pass through its entire area. The mesh member 59 secures the filter 8 to the container 4.

The gas that has entered the filter 8 diffuses in the filter 8 and, in the diffuse state, flows through the mesh member 59 adjacent to the filter into the airbag (not shown).

Figure 2:
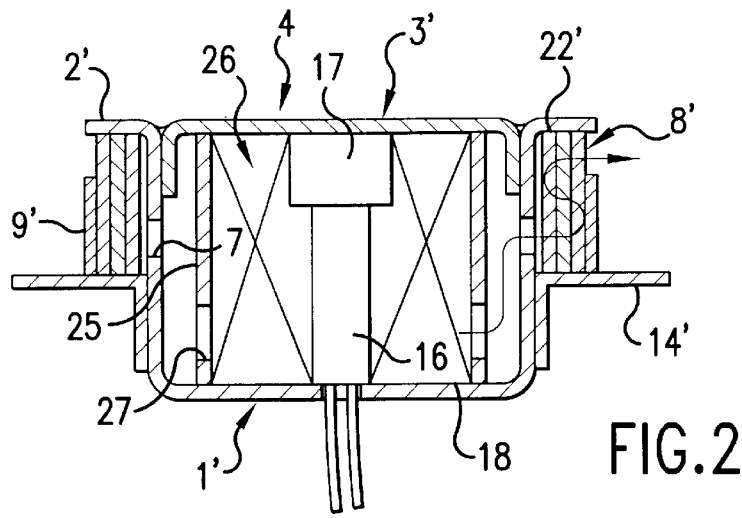
FIG. 2 is a cross-sectional view of another embodiment of a gas generator.

FIG. 2 shows another embodiment of the gas generator of this invention. Members identical to the corresponding members shown in FIG. 1 are assigned like reference numbers and their explanations are omitted. This gas generator is intended for a further improvement in the filtering action.

A first member 1' has an open end portion 2' and a support portion 22' formed integral with the open end portion 2'. A second member 3' closes the open end portion 2' and, along with the first member 1', forms the container 4. The first member 1' has a flange member 14' secured to the circumferential portion thereof. A filter 8' is held between the support portion 22' and the flange member 14' and arranged along the outer circumference of the container 4 so that it is restricted in the vertical and radial directions. The filter 8' is wider than the filter 8 shown in FIG. 1. A strip plate member 9' has a width slightly larger than one-half the filter width.

This gas generator has a combustion ring 25 that forms a combustion chamber 26. The combustion ring 25 is formed with a plurality of gas passing nozzles 27 at one end side portion thereof. The gas passing nozzles 27 are vertically deviated from the gas passing ports 7 so that the gas flow from the combustion chamber 26 follows a bent path as indicated by the arrow of FIG. 2. As a result, a gas energy loss occurs, reducing the speed of the gas flow, which in turn assures effective cooling of gas and arresting of combustion residues by the filter.

Figure 3:
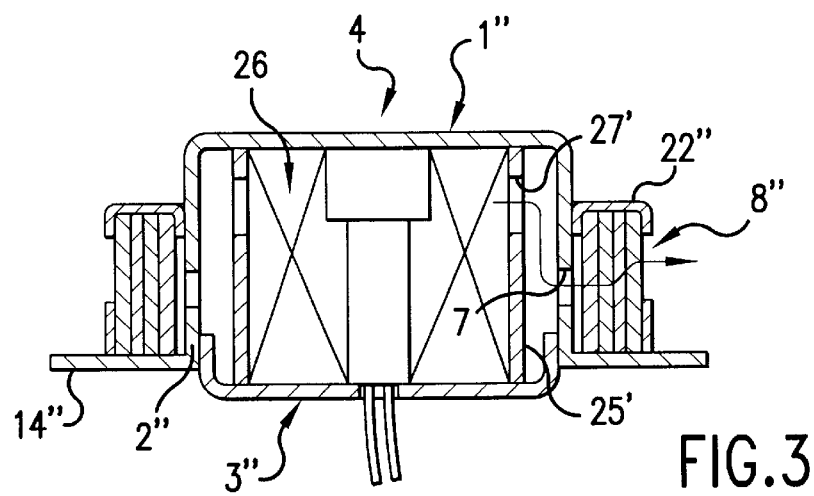
FIG. 3 is a cross-sectional view of still another embodiment of another embodiment of a gas generator.
Figure 4:
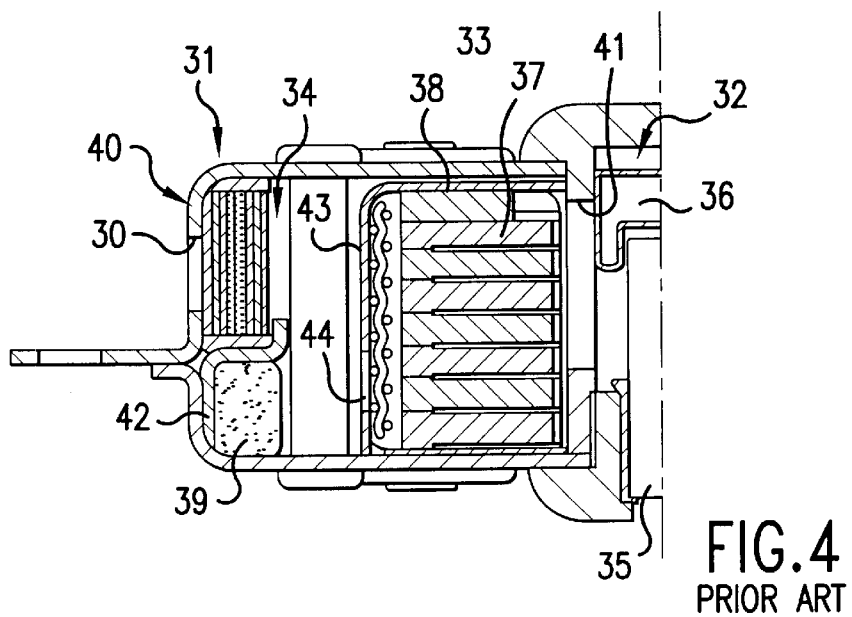
FIG. 4 is a partial cross-sectional view of a conventional gas generator.

The gas generator shown in FIG. 3 is also intended for a further improvement in the filtering action as in the case of FIG. 2.

A first member 1" has an open end portion 2" and a flange portion 14" formed integral with the open end portion 2". A second member 3" closes the open end portion 2" and, along with the first member 1", forms the container 4. The first member 1" has a support member 22" secured to the circumferential portion thereof. A filter 8" is held between the support portion 22" and the flange member 14" and arranged along the outer circumference of the container 4 so that it is restricted in the vertical and radial directions. The filter 8" is thicker than the filters shown in FIGS. 1 and 2.

A combustion ring 25' in this gas generator has gas passing nozzles 27' formed in the other end side portion thereof which is opposite to the one end side portion in FIG. 2. These gas passing nozzles 27' are vertically deviated from the gas passing ports 7 so that the gas-flow from the combustion chamber 26 follows a bent path as indicated by the arrow of FIG. 3. As a result, a gas energy loss occurs, reducing the speed of the gas-flow, which in turn assures effective cooling of gas and arresting of combustion residues by the filter.

What is claimed is:

1. A gas generator, comprising:

a housing having a plurality of gas discharge ports formed in a circumferential surface thereof for discharging combustion gas therefrom;

a flange portion provided outside said housing and extending in a direction perpendicular to a central axis of said housing;

a filter placed on said flange portion and covering the gas discharge ports;

a strip plate member provided on said flange portion and in contact with an outer circumferential surface of said filter to prevent said filter from expanding in a radial direction of said housing due to the combustion gas discharged from said gas discharge ports, said strip plate member having a height smaller than a height of said filter; and a support member provided outside said housing and facing said flange portion, wherein said filter is supported by said support member and said flange portion, wherein said support member and said strip plate member form a window outside said filter from which the combustion gas is discharged.

2. The gas generator according to claim 1, wherein said window does not oppose the gas discharge port in a radial direction of said housing.

3. A gas generator for an airbag, comprising:

a housing having a plurality of gas discharge ports formed in a circumferential surface thereof for discharging combustion gas therefrom, said housing having a circular portion perpendicular to a central axis of said housing;

a flange portion provided outside said housing and extending in a direction perpendicular to the central axis of said housing;

a filter placed on said flange portion and covering the gas discharge ports; and a mesh member covering said filter and said circular portion.

4. The gas generator for an airbag according to claim 3, wherein said filter is circular and has an arc-shaped cross section, said filter has a first end face in contact with said flange portion and a second end face in contact with a circumferential wall portion of said housing.

5. The gas generator for an airbag according to claim 4, further comprising:

a fixing ring for attaching the mesh member to said flange portion.

\* \* \* \* \*